United States Patent
Chou (10) Patent No.: US 6,347,817 B1
(45) Date of Patent: Feb. 19, 2002

(54) LOCKING DEVICE FOR USE IN A CARGO SUPPORT TO LOCK A RETRACTABLE TUBE

(76) Inventor: Yeh-Chien Chou, 3F., No. 18, Lane 78, Wen-Hwa III Rd., Kuei San Hsiang, Taoyuan Hsien (TW)

( * ) Notice: Subject to any disclaimer, the term of this patent is extended or adjusted under 35 U.S.C. 154(b) by 0 days.

(21) Appl. No.: 09/520,170

(22) Filed: Mar. 7, 2000

(51) Int. Cl.[7] .............................................. E05C 19/18
(52) U.S. Cl. ........................ 292/259 R; 292/DIG. 53; 292/DIG. 54; 292/DIG. 60; 254/105; 254/106; 254/107; 254/108; 254/109; 254/110; 254/111; 254/112; 254/113; 254/114; 254/115; 254/116; 254/117; 254/118; 248/74.1; 248/74.4; 248/230.6; 248/916
(58) Field of Search ..................... 292/259 R, DIG. 53, 292/DIG. 54, DIG. 60; 254/105–118; 248/74.1, 74.4, 230.6, 916; 403/322.4

(56) References Cited

U.S. PATENT DOCUMENTS

| | | | | |
|---|---|---|---|---|
| 1,161,099 A | * | 11/1915 | Willour | 254/118 |
| 1,406,302 A | * | 2/1922 | Tobias | 254/111 |
| 2,411,768 A | * | 11/1946 | Welch | 410/151 |
| 3,049,328 A | * | 8/1962 | Bishop | 52/632 |
| 4,160,539 A | * | 7/1979 | Johnson | 254/106 |
| 4,349,223 A | * | 9/1982 | Spector | 292/259 R |
| 4,434,970 A | * | 3/1984 | Boland et al. | 254/108 |
| 4,669,934 A | * | 6/1987 | Wisecarver | 410/151 |
| 4,958,867 A | * | 9/1990 | Champagne | 292/259 R |
| 5,094,576 A | * | 3/1992 | Fredelius | 410/151 |
| 5,255,946 A | * | 10/1993 | Allerding et al. | 292/259 R |
| 5,443,342 A | * | 8/1995 | Huang | 410/151 |
| 5,769,580 A | * | 6/1998 | Purvis | 410/451 |
| 5,813,647 A | * | 9/1998 | Chen | 248/354.7 |
| 5,833,414 A | * | 11/1998 | Feldman et al. | 410/151 |
| 5,890,856 A | * | 4/1999 | Huang | 410/151 |
| 5,947,666 A | * | 9/1999 | Huang | 410/151 |
| 5,988,963 A | * | 11/1999 | Shiau | 410/151 |
| 6,186,715 B1 | * | 2/2001 | Oliviero | 410/151 |

* cited by examiner

Primary Examiner—B. Dayoan
Assistant Examiner—Carlos Lugo
(74) Attorney, Agent, or Firm—Varndell & Varndell, PLLC (57) ABSTRACT

A locking device installed in a cargo support to lock a retractable tube, including a holder frame fastened to the outer tube of the retractable tube, a rack moved in a longitudinal sliding way defined between two parallel lugs of the holder frame, a driving lever pivoted to the holder frame for moving the rack, and a locking block pivoted to the holder frame and retained by a spring to lock the driving lever, wherein a L-shaped locating plate is mounted in the holder frame for the positioning of the outer tube of the retractable tube, having a round hole on a transverse section thereof through which the inner tube is inserted into the outer tube, two stop flanges bilaterally extended from a longitudinal section thereof and respectively engaged with respective end notches on the holder frame, and a lug extended from one stop flange and fastened to a lug at the holder frame; the holder frame and the locking block are respectively made of iron.

2 Claims, 8 Drawing Sheets

LOCKING DEVICE FOR USE IN A CARGO SUPPORT TO LOCK A RETRACTABLE TUBE

BACKGROUND AND SUMMARY OF THE INVENTION

The present invention relates to a locking device for use in a cargo support to lock a retractable tube, and more particularly to such a locking device, which fits different retractable tubes.

Figure 7:
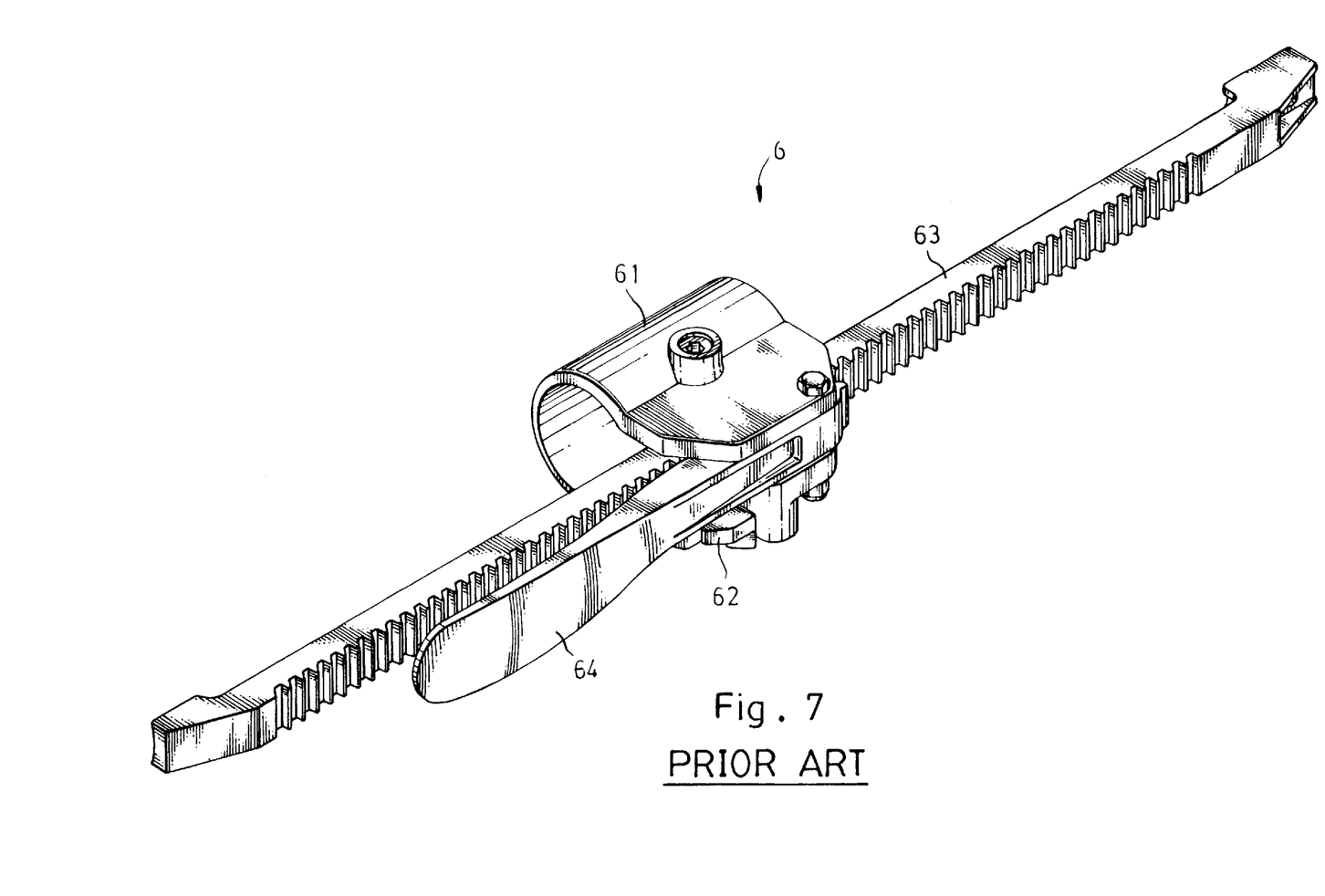
FIG. 7 is a perspective view of a locking device according to the prior art.
Figure 8:
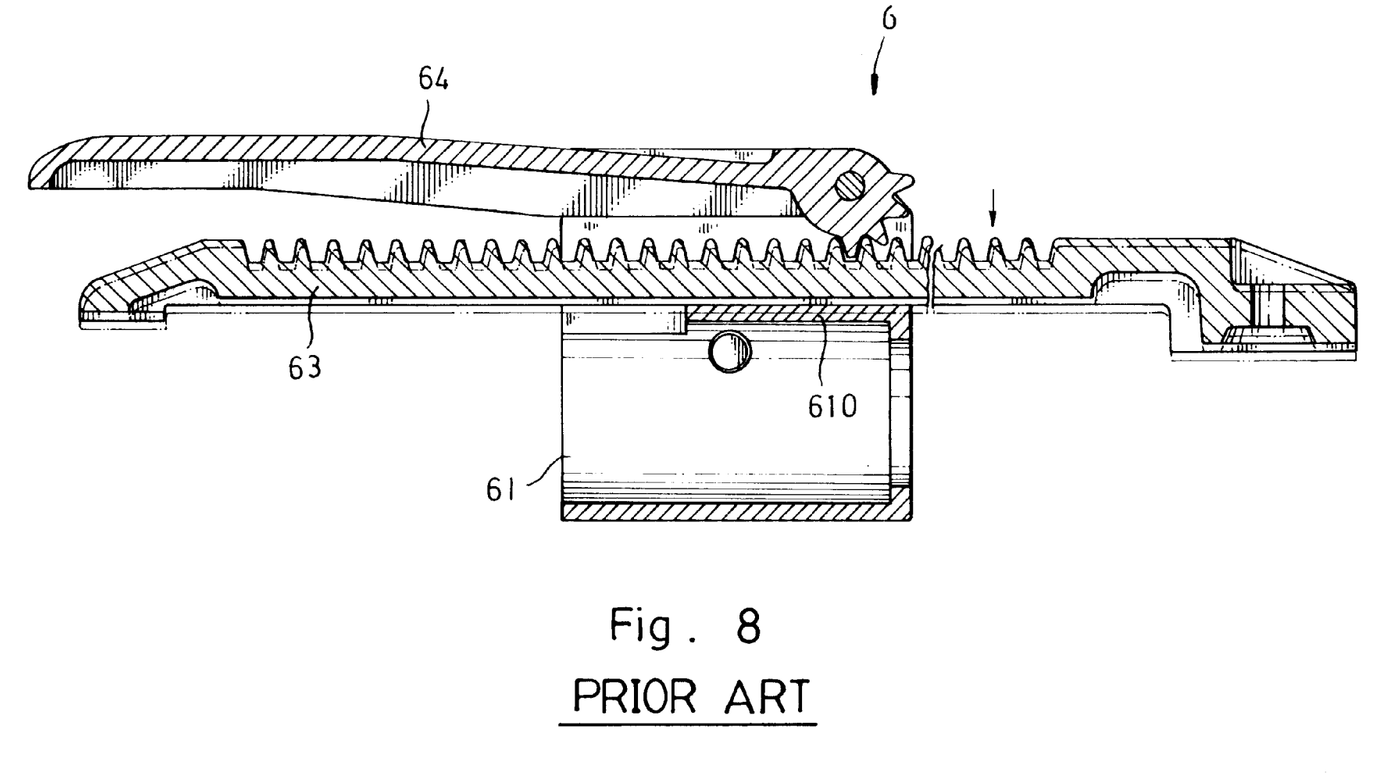
FIG. 8 is a sectional view of the locking device shown in FIG. 7.

In a motor truck, a cargo support may be used to support cargo in place, preventing cargo from falling down. The cargo support has a retractable tube for adjustment, and a locking device controlled to lock the retractable tube. FIGS. 7 and 8 show a locking device 6 comprises a holder frame 61 made of aluminum, a locking block 62 made of copper, a rack 63, and a driving lever 64. This structure of locking device is still not satisfactory in function. The drawbacks of this structure of locking device are outlined hereinafter.

1. The holder frame 61 must be use with a retractable tube having an outer tube of circular cross section.

2. Because the holder frame 61 and the locking block 62 are respectively made of aluminum and copper, the manufacturing cost of the locking device 6 is high, and the connection area between the holder frame 61 and the locking block 62 tends to be damaged.

3. The bearing face 610 of the holder frame 61 which support the rack 63 wears quickly with use. When the bearing face 610 starts to wear, the rack 63 tends to be forced out of the engaged position, causing the driving lever 64 unable to drive the rack 63 positively.

The present invention provides a locking device, which eliminates the aforesaid drawbacks. According to the present invention, the locking device comprises a holder frame fastened to the outer tube of the retractable tube, a rack moved in a longitudinal sliding way defined between two parallel lugs of the holder frame, a driving lever pivoted to the holder frame for moving the rack, a locking block pivoted to the holder frame and retained by a spring to lock the driving lever, and a L-shaped locking plate mounted in the holder frame for the positioning of the outer tube of the retractable tube. The locating plate comprises a round hole on a transverse section thereof through which the inner tube is inserted into the outer tube, two stop flanges bilaterally extended from a longitudinal section thereof and respectively engaged with respective end notches on the holder frame, and a lug extended from one stop flange and fastened to a lug at the holder frame. Further, the holder frame, the locating plate and the locking block are respectively made of iron for the advantages of low cost and high structural strength.

DETAILED DESCRIPTION OF THE PREFERRED EMBODIMENT

Referring to Figures from 1 through 6, a locking device in accordance with the present invention is generally comprised of a holder base unit 1, a locking block 2, a rack 3, and a driving lever 4.

The holder base unit 1 comprises a holder frame 11, and a locating plate 12. The holder frame 11 is made by stamping a metal plate into a substantially retractable casing, having two parallel lugs 110 and 111, a longitudinal sliding way 112 defined between the parallel lugs 110 and 111, two locating end notches 113 longitudinally bilaterally disposed at one end, namely, the front end thereof adjacent to the lugs 110 and 111, two first pivot holes 1101 and 1111 respectively formed on the lugs 110 and 111 near one end, namely, the rear end thereof, a second pivot hole 1110 formed on one lug 111 near the front end, and a screw hole 114 on one sidewall thereof. The locating plate 12 is a substantially L-shaped metal plate inserted into the holder frame 11, having a round hole 120 on the transverse section thereof, two stop flanges 121 and 122 respectively bilaterally extended from the longitudinal section thereof at one end remote from the transverse section and respectively engaged into the locating end notches 113 at the holder frame 11 by pin 13, a lug 123 formed integral with and perpendicularly extended from one stop flanges 122, and a pivot hole 1230 on the lug 123. When holder frame 11 is coupled to the outer (round or rectangular) tube 51 of a retractable tube 5 in a cargo support (see FIGS. 5 and 6), a tightening up screw 15 is threaded into the screw hole 114 to hold down the outer tube 51. The locking block 2 comprises a pivot hole 20 disposed at one end and pivotally connected to the second pivot hole 1110 on one lug 111 of the holder frame 11 and the pivot hole 1230 on the lug 123 of the locating plate 12, a locating rod 21 diposed adjacent to the pivot hole 20 and holding a spring 23 against a part of the holder frame 11, a finger strip 25 downwardly extended from one end thereof remote from the pivot hole 20, and a hook 24 spaced between the pivot hole 20 and the finger strip 25. The rack 3 is longitudinally slidably inserted through the longitudinal sliding way 112 between the lugs 110 and 111 of the holder frame 11 and supported on the L-shaped locating plate 12, having two end hooks 31 and 32 respectively formed integral with two distal ends thereof for hooking on the outer tube 51 and inner tube 50 of the retractable tube 5 respectively, and a screw hole 320 disposed on one end therefore for fastening to the inner tube 50 by a screw. The driving lever 4 comprises pivot hole 40 near one end, namely, the front end thereof and pivotally connected between the pivot holes 1101 and 1111 on lugs 110 and 111 of the holder frame 11 by a pivot bolt 14, a serrated portion 41 disposed at the front end around the pivot hole 40 and engaged with the rack 3, and a protruding flange 42 extended from one side thereof on the middle for engagement with the hook 24 of the locking block 2. Continuously turning the driving lever 4 causes the rack 3 to be moved in the longitudinal sliding way 112, and therefore the inner tube 50 of the retractable tube 5 is moved with the rack 3 relative to the outer tube 51 to adjust the length of the retractable tube 5. When set, the hook 24 of the locking block 2 is hooked on the protruding flange 42 of the driving lever 4, causing the driving lever 4 to be locked.

Figure 1:
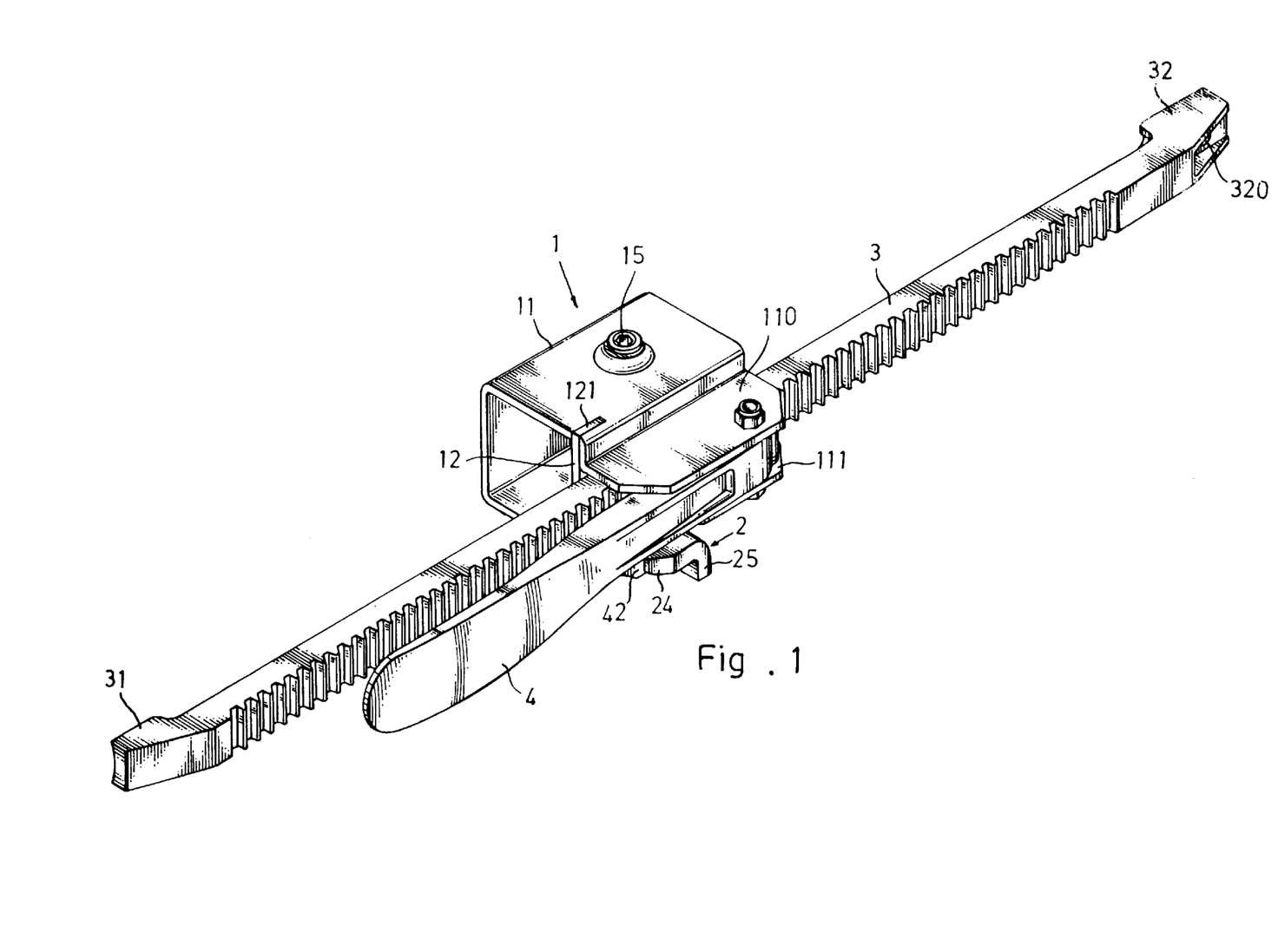
FIG. 1 is a perspective view of a locking device according to the present invention.
Figure 2:
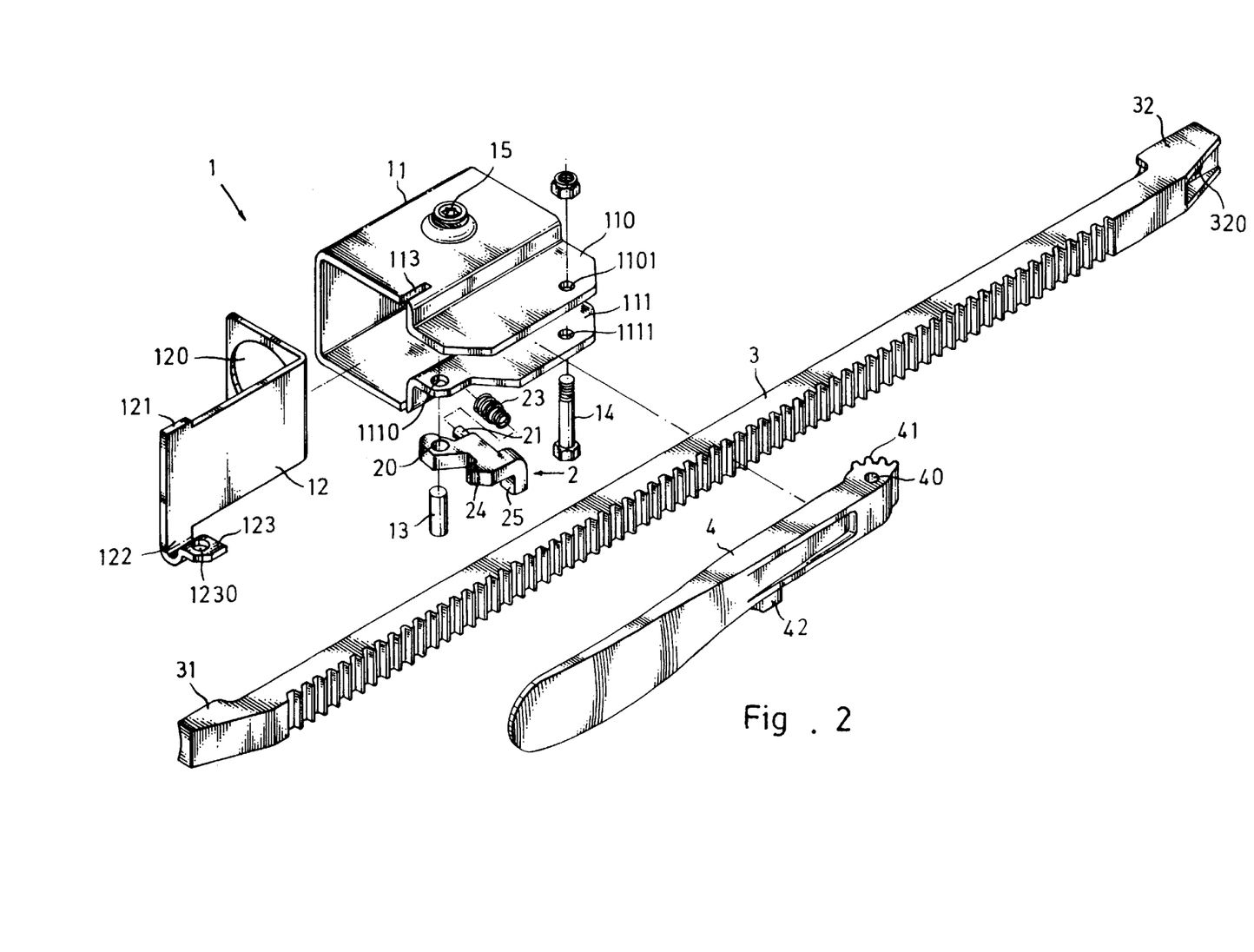
FIG. 2 is an exploded view of the locking device shown in FIG. 1.
Figure 3:
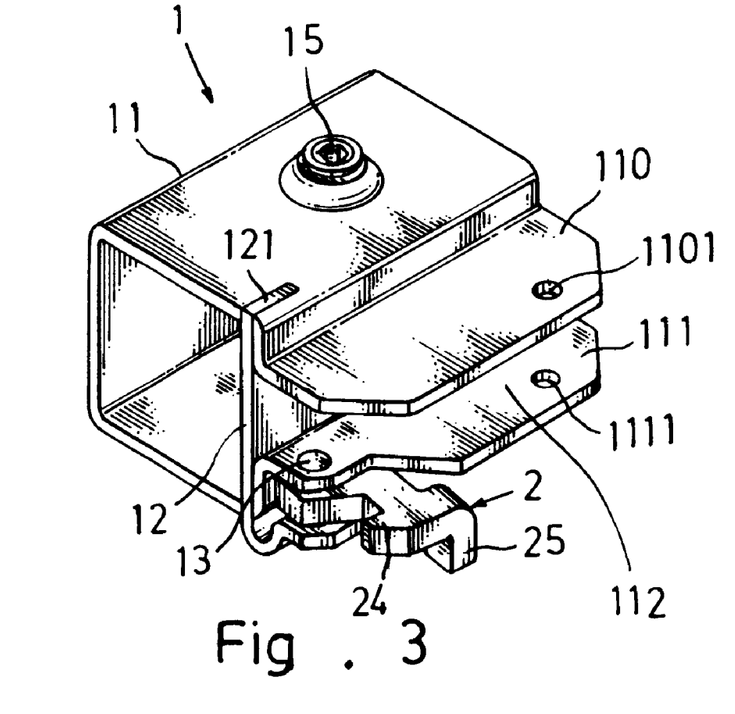
FIG. 3 is a perspective view of a part of the present invention, showing the L-shaped locating plate installed in the holder frame, the locking block pivoted to one lug of the holder frame.
Figure 4:
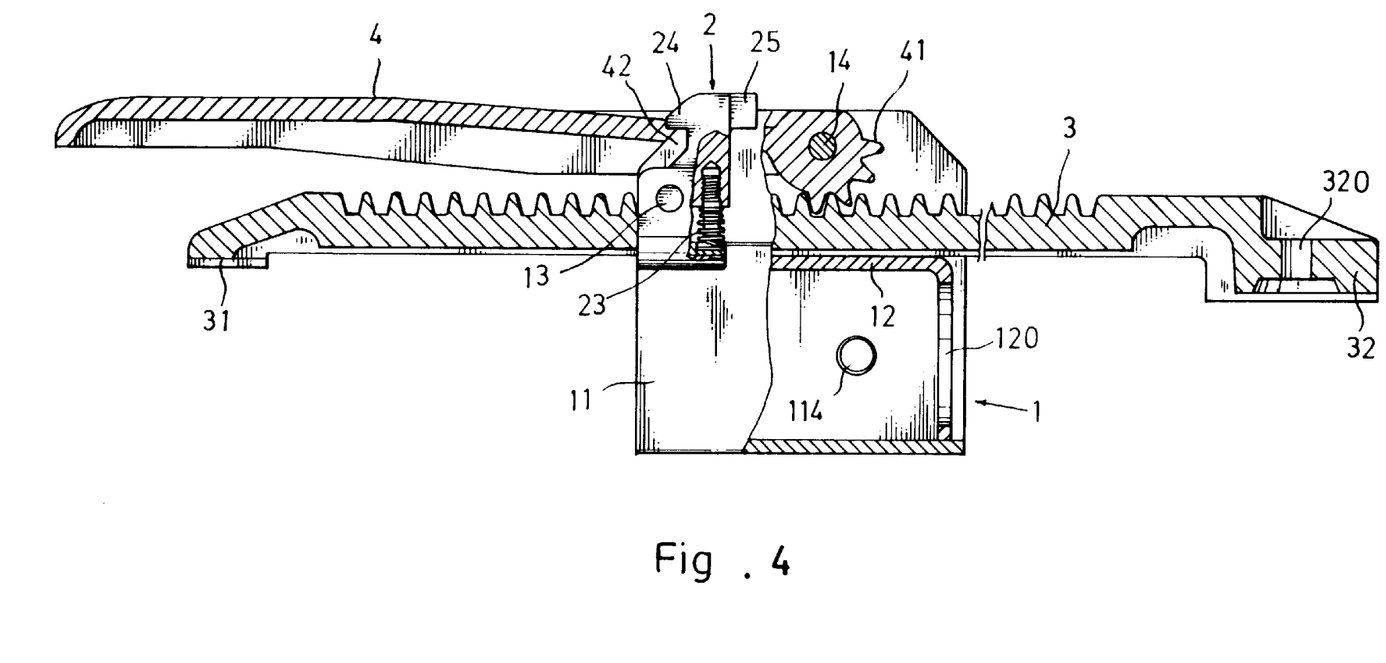
FIG. 4 is a sectional view of the locking device according to the present invention.
Figure 5:
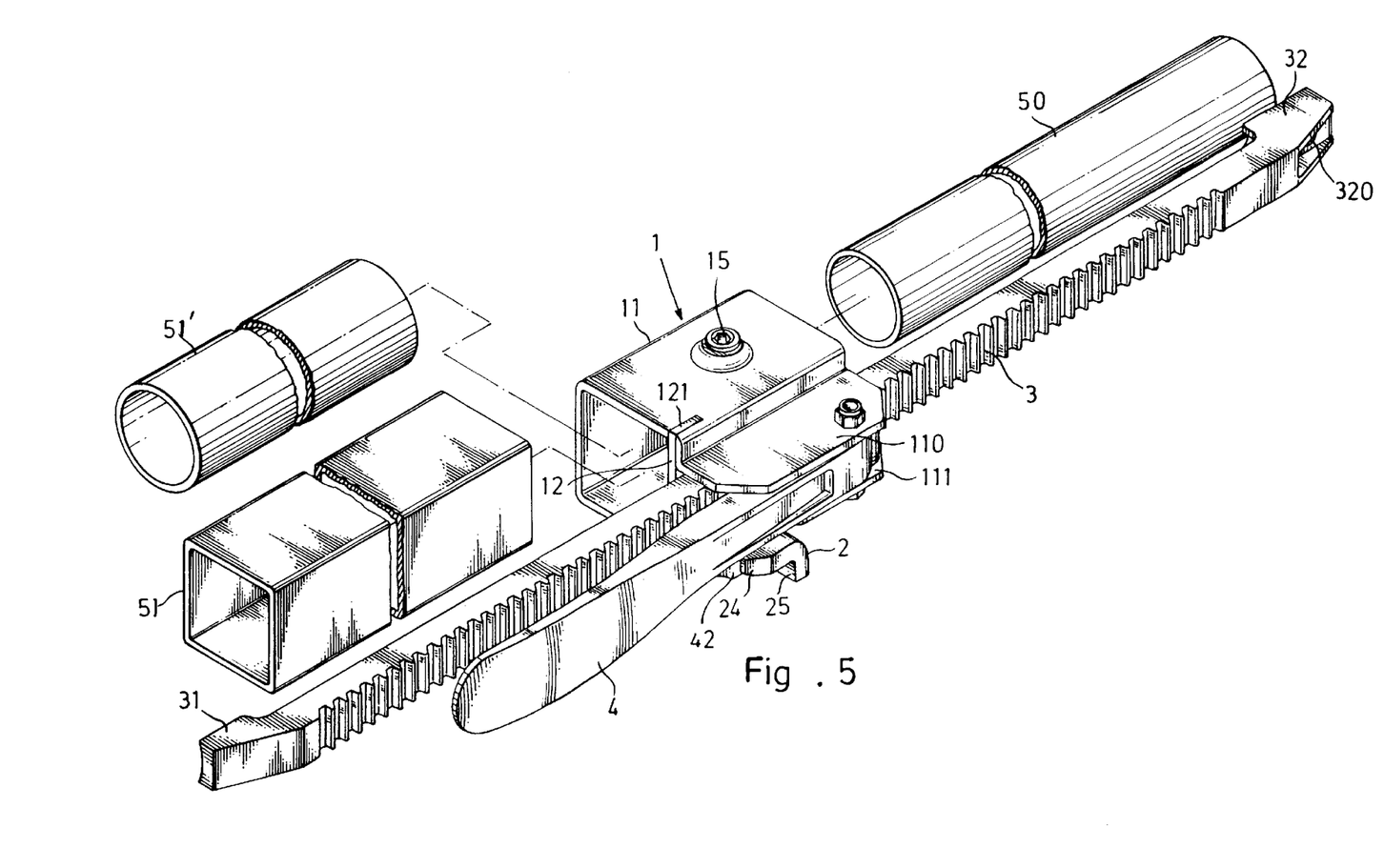
FIG. 5 illustrates the use of the present invention with different designs of retractable tube.
Figure 6:
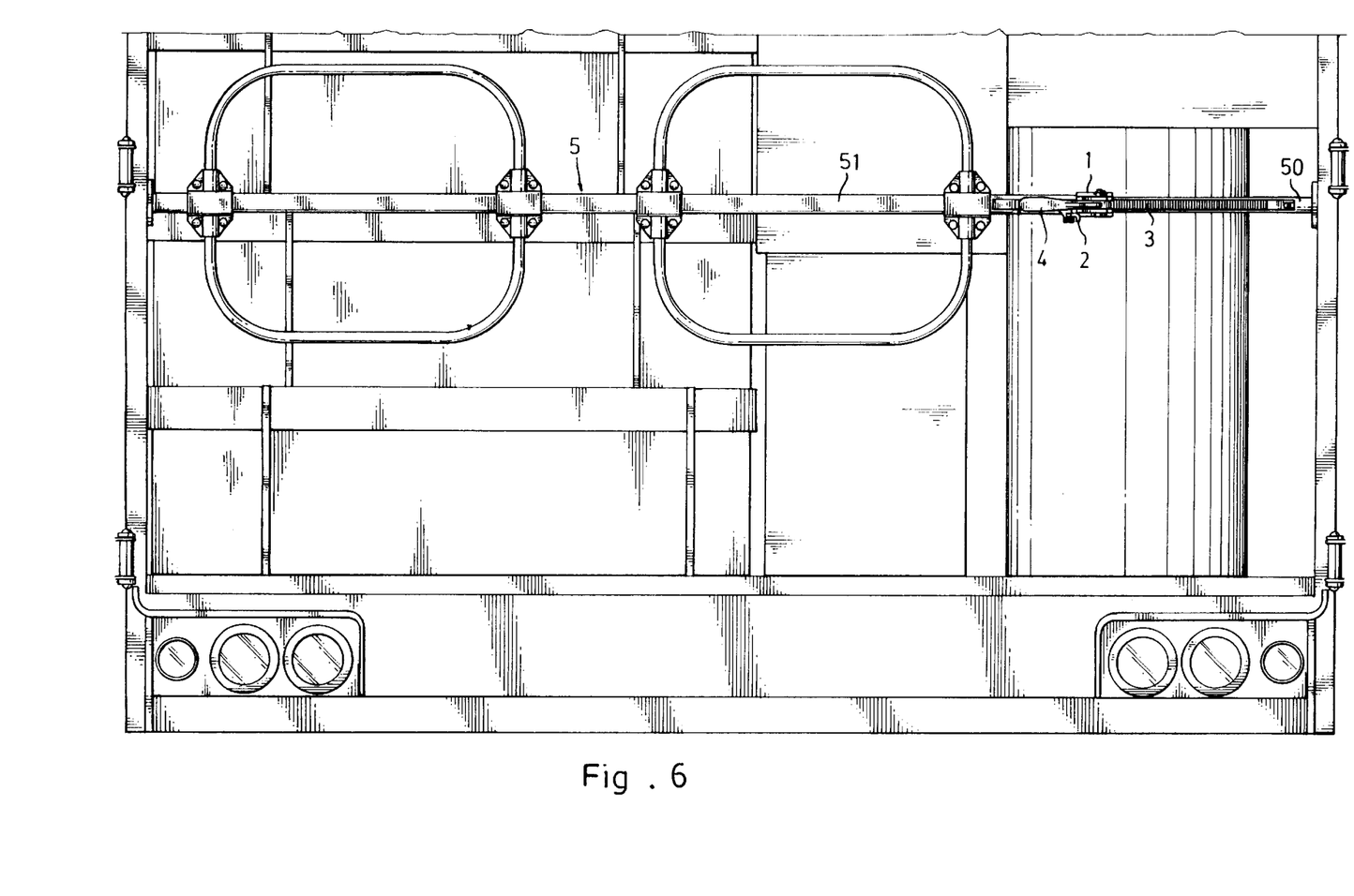
FIG. 6 is an applied view of the present invention, showing the locking device installed in a retractable tube in a cargo support.

Further, the holder frame 11 and the L-shaped locating plate 12 are made of iron for the advantage of high structural strength and low manufacturing cost. Because the locating plate 12 has a round hole 120 on its transverse section, the holder base unit 1 fit the outer tubes 51, 51' of a retractable tube 5 of any of a variety of designs.

While only one embodiment of the present invention has been shown and described, it will be understood that various modifications and changes could be made thereunto without departing from the spirit and scope of the invention disclosed.

What is claimed is:

1. A locking device used in a cargo support to lock a retractable tube having an outer tube and an inner tube, comprising:

a holder frame unit, said holder frame unit comprising a holder frame coupled to the outer tube of said retractable tube, said holder frame comprising two parallel lugs, and a longitudinal sliding way defined between the parallel lugs;

a rack moved in the longitudinal sliding way between the parallel lugs of said holder frame, said rack having two end hooks for engagement with the outer tube and inner tube of said retractable tube, and a screw hole at one end fixedly fastened to the inner tube of said retractable tube;

a driving lever pivoted to said holder frame for driving said rack, said driving lever comprising a serrated portion disposed at one end thereof and engaged with said rack, and a protruding flange disposed at one side thereof on the middle;

a locking block pivoted to one lug of said holder frame for locking said driving lever, said locking block comprising a free end terminating a finger strip, and a hook for hooking on the protruding flange of said driving lever; and spring means connected between said holder frame and said locking block to hold said locking block in engagement with the protruding flange of said driving lever;

wherein said holder frame has a rectangular cross section, two locating end notches longitudinally bilaterally disposed at one end thereof adjacent to the lugs of said holder frame, and a screw hole on one sidewall thereof; said holder frame unit further comprises a tightening-up screw threaded into the screw hole on said holder frame to hold down the outer tube of said retractable tube, and a L-shaped locating plate mounted in said holder frame to hold the outer tube of said retractable tube in place, said locating plate comprising a transverse section transversely disposed inside said holder frame, a longitudinal section connected to said transverse section at right angles, a round hole on said transverse section for the positioning of the outer tube of said retractable tube, two stop flanges respectively bilaterally extended from said longitudinal section at one end remote from said transverse section and respectively engaged into the locating end notches at said holder frame, a lug formed integral with and perpendicularly extended from one stop flange and fastened to one lug of said holder frame.

2. The locking device of claim 1 wherein said holder frame and said locking block are respectively made of iron.

* * * * *